(No Model.) 4 Sheets—Sheet 3.
E. E. HARTZELL.
CULTIVATING AND PLANTING APPARATUS.
No. 551,207. Patented Dec. 10, 1895.
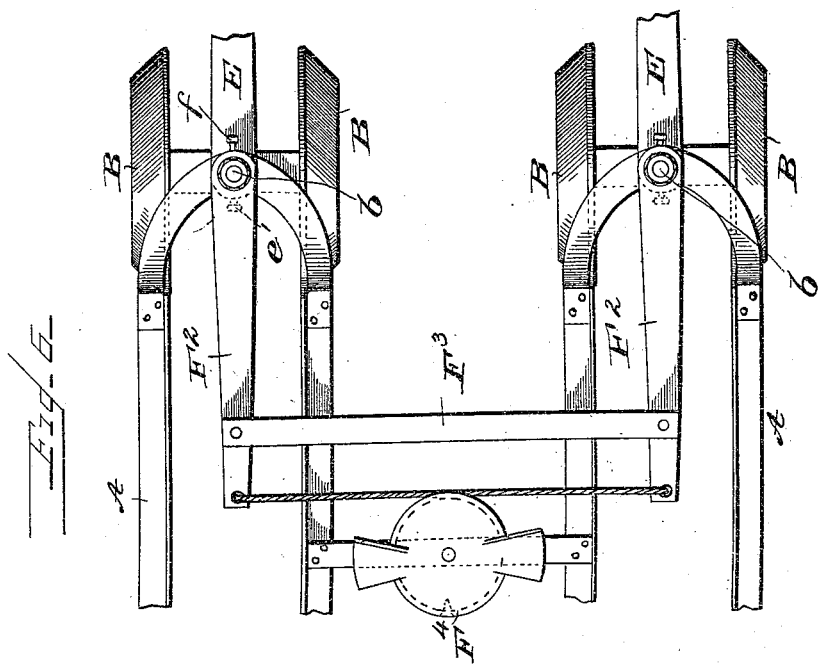
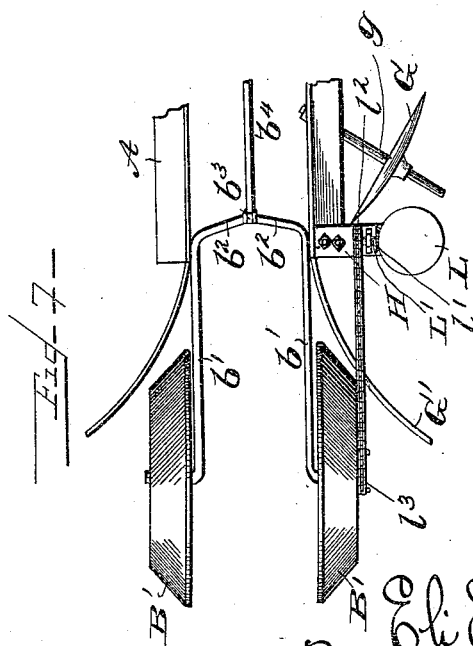
Witnesses
G. A. Pauberschmidt,
J. D. Kingsbery
Inventor
Eli E. Hartzell
By
Whitaker Prevost Attorneys (No Model.) 4 Sheets—Sheet 4.
E. E. HARTZELL.
CULTIVATING AND PLANTING APPARATUS.
No. 551,207. Patented Dec. 10, 1895.
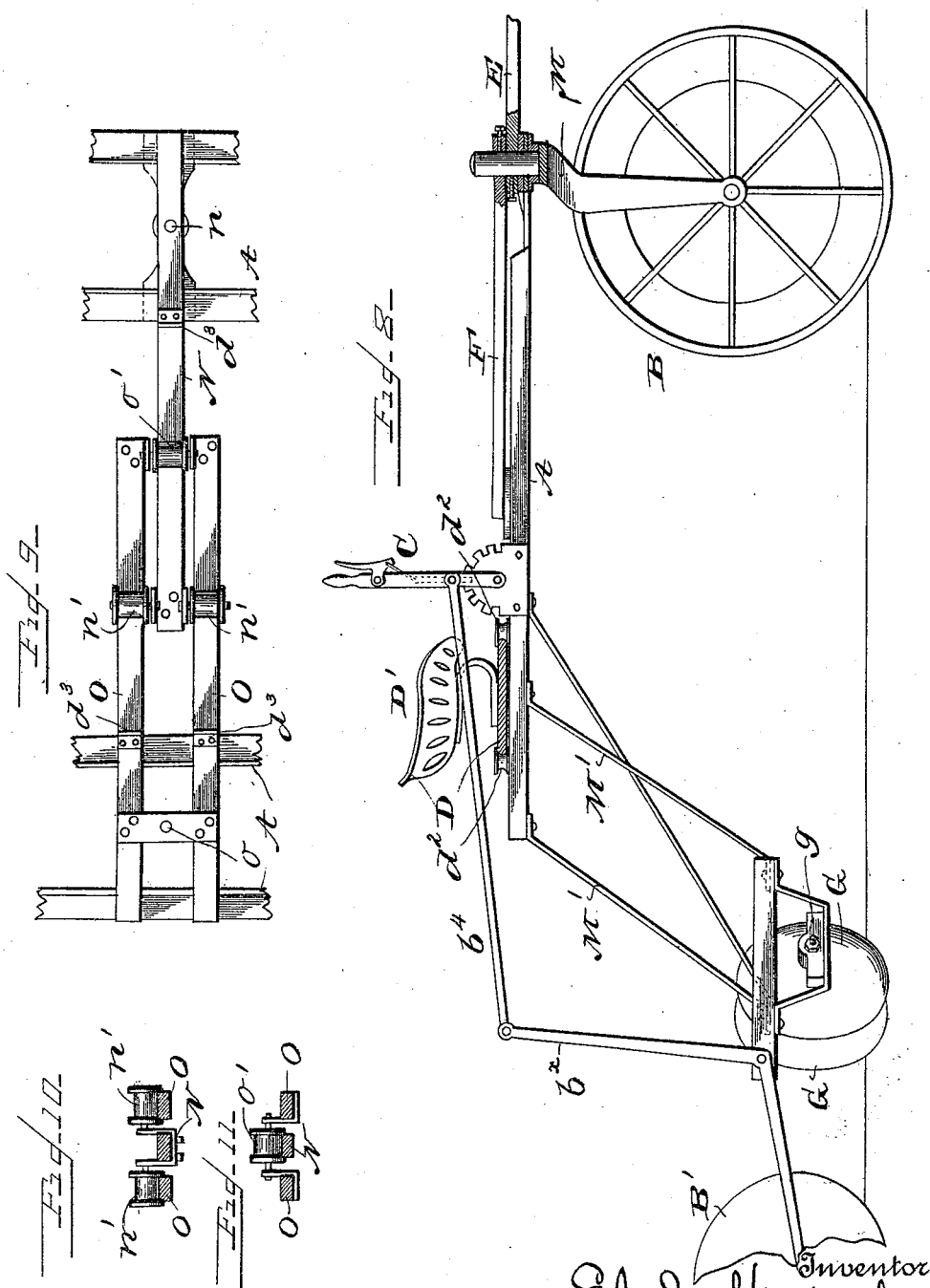
Witnesses
G. A. Tauberschmidt,
J. D. Kingsbury
Inventor
Eli E. Hartzell
By Whitaker & Prevost
Attorneys

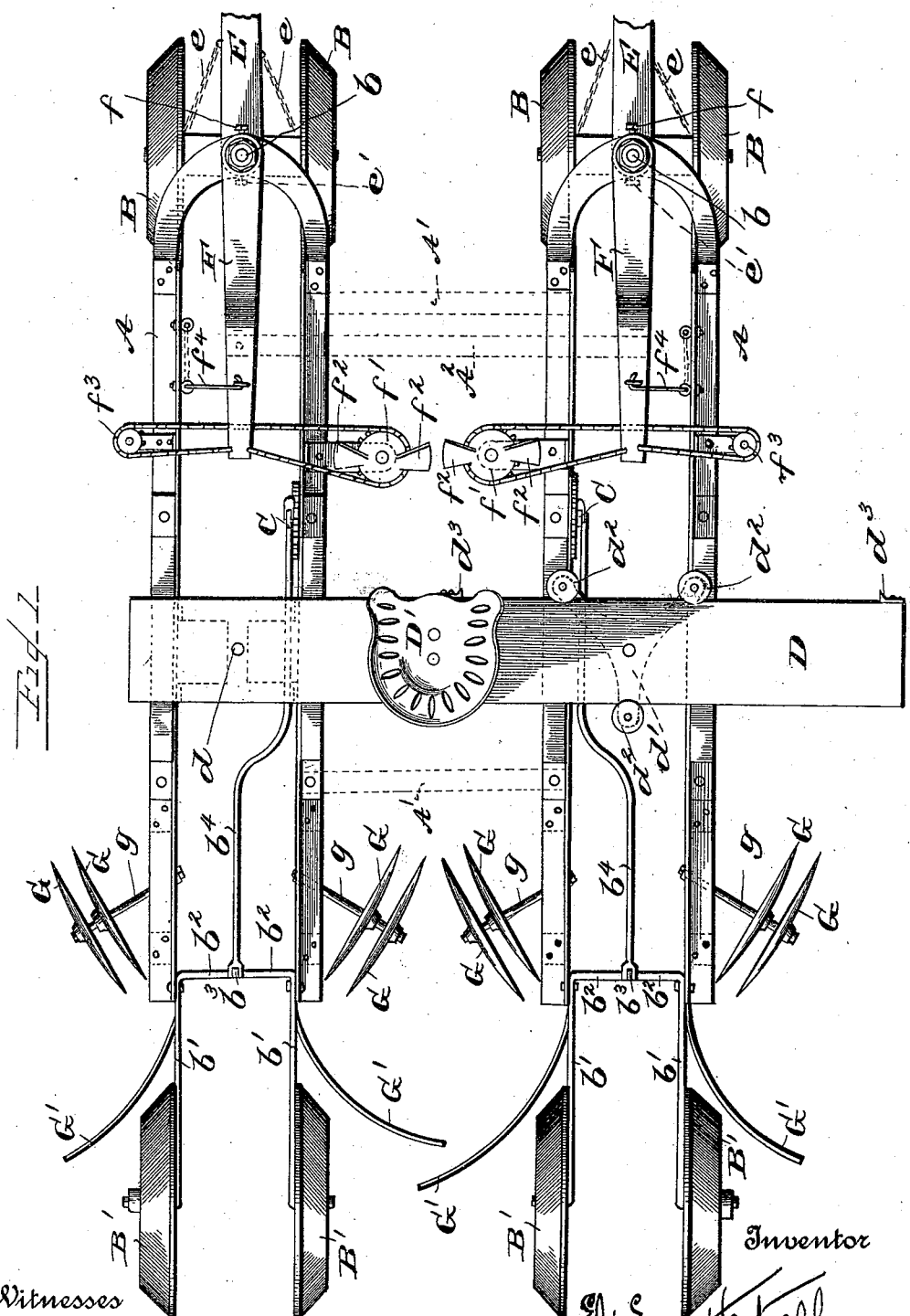

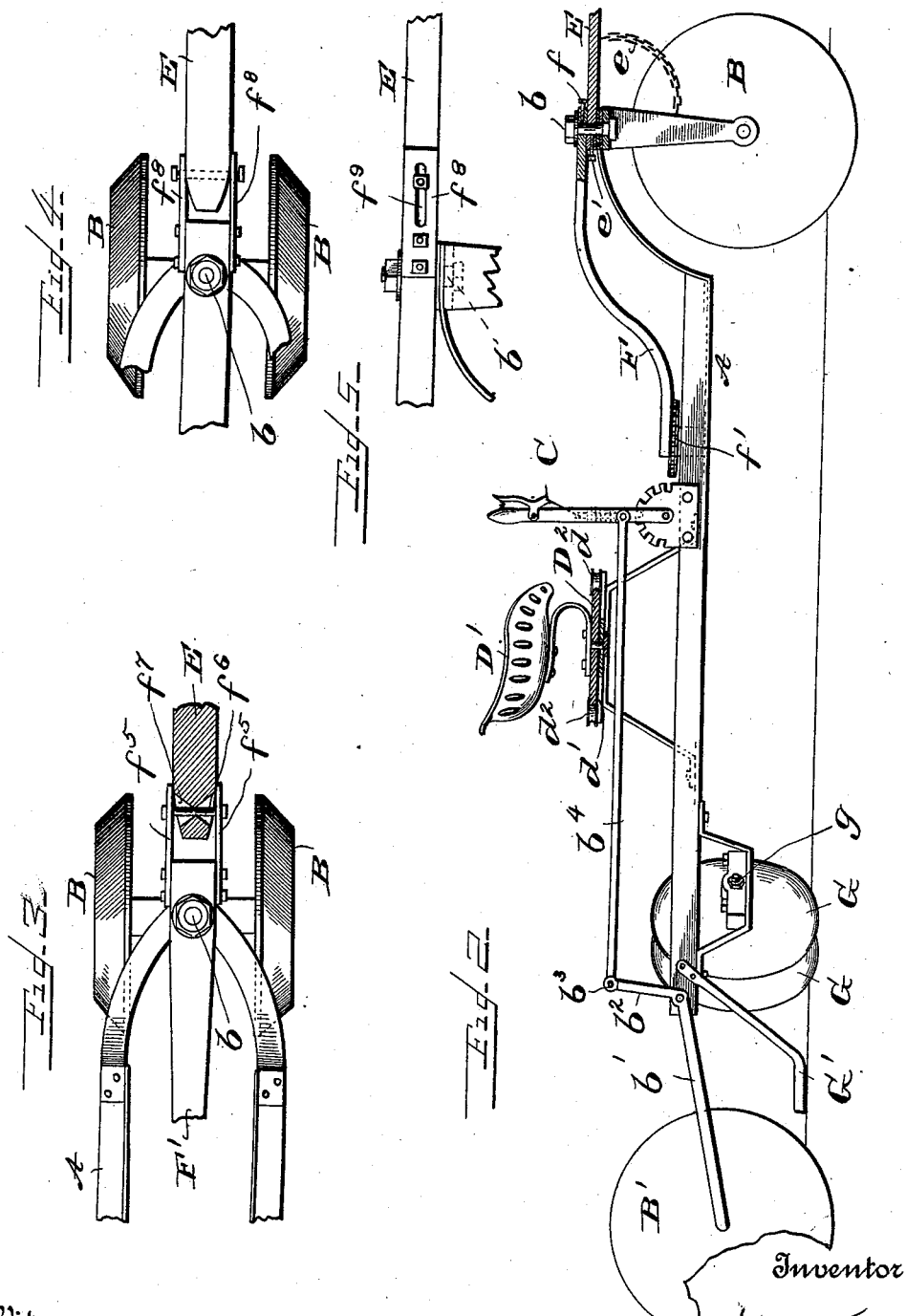

UNITED STATES PATENT OFFICE.

ELI E. HARTZELL, OF BEATRICE, NEBRASKA.

CULTIVATING AND PLANTING APPARATUS.

SPECIFICATION forming part of Letters Patent No. 551,207, dated December 10, 1895.

Application filed May 15, 1895. Serial No. 549,434. (No model.)

*To all whom it may concern:*

Be it known that I, ELI E. HARTZELL, a citizen of the United States, residing at Beatrice, in the county of Gage and State of Nebraska, have invented certain new and useful Improvements in Cultivating and Planting Apparatus; and I do hereby declare the following to be a full, clear, and exact description of the invention, such as will enable others skilled in the art to which it appertains to make and use the same.

My invention is an improvement in cultivating and planting apparatus; and it consists in the novel features of construction hereinafter described, reference being had to the accompanying drawings, which illustrate one form in which I have contemplated embodying my invention, and said invention is fully disclosed in the following description and claims.

Referring to the said drawings, Figure 1 represents a top plan view of a double cultivator embodying my invention. Fig. 2 represents a vertical longitudinal section through one of the cultivator-frames. Figs. 3, 4, and 5 are detail views illustrating modified forms of tongue-attaching devices. Fig. 6 is a top plan view of the front portion of the machine, showing a modified form of steering mechanism. Fig. 7 represents the rear portion of one of the cultivator-frames, showing a planting device attached thereto. Fig. 8 is a view similar to Fig. 2, showing a high-frame cultivator embodying my invention. Fig. 9 is a plan view of a slightly-modified form of coupling device, and Figs. 10 and 11 are transverse sectional views of the same.

The object of my invention is to provide a machine for cultivating two rows of plants in which the two cultivator-frames are provided with independent steering devices, so that they may be kept in line with the rows of plants, independent of the tongues or drawing devices, and also to provide such a construction as may be adapted for work in fields which have been check-rowed or listed and also to provide for the attachment of planting devices so that the machine may be used for planting when desired.

In the form of machine illustrated in Figs. 1 and 2, A A represent the two cultivator-frames, formed preferably of angle-iron suitably connected. The front portion of each of these frames is supported by a pair of guiding-rollers, which are mounted on suitable axles carried by an arch, which is pivotally connected with an upwardly-projecting portion of the frame by a king-bolt $b$. The guiding-rollers B B are preferably provided with cone-shaped peripheral portions, as shown. At the rear end of each of the cultivator-frames are a pair of similar rollers B' B' carried by arms $b'$ $b'$, having upwardly-extending parts $b^2$ $b^2$ connected by a cross-bar $b^3$, to which is attached a rod $b^4$ extending forward and connected to a hand-lever C provided with the usual segment and pawl, so that the rear end of the frame can be raised or lowered by means of this lever C.

The cultivator-frames are coupled together by a coupling-board D, which I prefer to arrange in the following manner: The board D is pivotally secured to an elevated portion of one frame by a pivot-bolt $d$. The other frame is provided with a three-armed casting $d'$, which is pivotally secured to an elevated portion of the frame, and has each of its arms provided with a grooved roller $d^2$, the said rollers being so arranged that two of the same will engage one edge of the coupling-board and the other roller will engage its other edge. By this construction the coupling-board can slide freely between said rollers, to allow the frames to approach or recede from each other, the frames are allowed such longitudinal play as is necessary, and the two frames are held in a horizontal position and caused to act together. Upon the coupling-board D, I mount the driver's seat D'. In order to prevent the cultivator-frames from moving laterally too far in either direction, I provide the coupling-board with suitable stops $d^3$ $d^3$, as shown in Fig. 1, which will engage the rollers $d^2$ $d^2$ and limit the movement of the cultivator-frames.

I prefer to provide each frame with a tongue E, which is provided with a collar engaging the king-bolt band. I also provide guard-chains $e$ $e$, secured to the tongue E and to the axles of the guiding-rollers B B, which are sufficiently loose to allow the tongue about three feet of play at its outer end. The collar surrounding the king-bolt is however provided with a set-screw $e'$, which may be tightened so as to rigidly connect the tongue with the king-bolt, and thus enable each frame to be steered by means of the tongue, when desired.

The king-bolt $b$ is provided with a steering-arm F, extending rearwardly from the said bolt and secured in this instance by means of a collar engaging the bolt, and a set-screw $f$ in said collar engaging the bolt, and to the rear end of this arm F are secured the steering devices adapted to be operated by the foot of the driver. In Fig. 1 I have shown independent steering devices for the two frames, and this construction will be found most desirable for work in fields which have not been check-rowed. Upon a bracket secured to the frame A in front of the driver is mounted a pulley $f'$, provided on opposite sides with foot-plates or levers $f^2 f^2$. A pulley $f^3$ is supported by a bracket on the opposite side of the frame A in a transverse line with the pulley $f'$. An operating-chain, cord, or other flexible connection is secured to the end of the steering-lever F and passes around the pulleys $f'$ and $f^3$. The flexible connection will have sufficient engagement with the pulley $f'$, so that as the said pulley is moved by the foot in one direction or the other the steering-bar will be moved, thus turning the king-bolt and the pivoted truck carrying the guiding-rollers. By means of this steering apparatus the operator can keep each frame in line with the row of plants which it is desired to cultivate, independently of the horses.

At the rear of each frame A the cultivating or earth-engaging devices are located. In this instance I have shown each of the side bars of each frame provided with a shaft $g$, carrying one or more cultivating-disks G G. These shafts are each mounted in a pivoted bearing-block supported by a bracket from the main frame A, the said bearing-block being provided with adjusting-bolts, so that the disks may be set at any desired angle, as is customary in such constructions. The depth of cut of the disks is regulated by raising or lowering the rear guiding-rollers, as hereinbefore described. I also prefer to provide each side bar of the frame A with a scraper-blade G', which is adjustably secured to the frame-bar, in rear of the disks.

In case it should be desired to positively lock the front guiding-trucks of the frames from movement, I provide a locking device for each of the steering-bars F F, consisting in this instance of a hook $f^4$ pivotally connected to one of the frame-bars and adapted to engage a suitable eye on the steering-bar.

In Fig. 3 I have shown a slightly-modified form of tongue-attaching device, in which the tongue is attached to a forwardly-projecting portion of the steering-bar F' by means of metal plates $f^5$ and a bolt $f^6$, the aperture in the tongue which engages said bolt being flared, as shown at $f^7$, to allow the play of the tongue.

In Fig. 4 I have shown another slight modification of the tongue-attaching mechanism, in which the tongue is attached in the same manner as shown in Fig. 3, except that the attaching-plates $f^8$ are slotted longitudinally, as shown at $f^9$, to receive the cross-bolt, thus allowing the lateral play of the tongue without forming flaring recesses in the tongue, as in the form shown in Fig. 3.

If it is desired to use the machine in a field which has been check-rowed, it is not necessary that the frames should have any independent movement, and in such case the frames may be advantageously coupled together by suitable bars A' A', as indicated in dotted lines in Fig. 1. The steering-bars F F will then be coupled together by a detachable bar A$^2$, and the two frames can then be steered jointly instead of independently by the foot-levers $f^2$.

In Fig. 6 I have shown a modified form of steering apparatus, adapted particularly for check-rowed work, in which the steering-bars F$^2$ F$^2$ are connected by a bar F$^3$, the two frames are rigidly coupled together, and the two steering-bars are operated jointly by a single steering device. This steering device consists in this instance of a pulley F$^4$, mounted on a cross-bar connecting the two frames and provided on each side with a foot-lever. A cord, chain or other flexible connection extends from one of the steering-bars F$^2$ around said pulley to the other steering-bar, being preferably rigidly secured to the pulley. By this means the two front trucks can be steered jointly by a single steering apparatus.

I also prefer to provide my improved machine with detachable planting devices, so that it may be used to plant if it is found desirable to do so.

In Fig. 7 I have shown the rear portion of one of the cultivator-frames provided with my detachable planting device. A removable bracket H is secured to the frame in rear of the disk-shaft and upon this bracket is mounted a suitable drill K and any desired form of planting device L. L' represents a short shaft provided with a bevel-gear $l'$ for operating the planting device and a sprocket-wheel $l^2$ for operating said shaft. A sprocket-wheel $l^3$ is placed on the axle of one of the rear guiding-rollers, in line with the sprocket-wheel $l^2$ and detachably bolted to said roller so as to revolve therewith, and a sprocket-chain transmits motion from the wheel $l^3$ to the wheel $l^2$. One of the disks will be removed, as is shown in Fig. 7, and the remaining disk will form the furrow into which the seed is dropped by the planter. If a drill is used in connection with the planter the disk need not be used unless desired. The disks on the inside of each frame will be removed altogether when the device is used for planting. After the seed has been dropped the furrow or drill will be closed and the seed covered by the scraper, which follows in rear of the disks. It is obvious that the planting devices may be operated by a check-rowing apparatus of usual form, instead of being operated from the guiding-rollers, if preferred.

In Fig. 8 I have shown a high-frame cultivator embodying my invention, and designed to cultivate corn until it is of such a height that cultivation is discontinued. In this case I employ much larger front guiding-rollers, supported from an arch as before described, and I provide the arch or the pivotal shank connected therewith with a retreating shoulder M, as shown, thus providing a caster construction, as will be readily seen, which assists in keeping the wheels normally in a straight line. I term this connection between the wheels and the frame a "caster connection," for convenience of designation. The frame of the machine is carried straight back from the front wheels, which are steered in the manner previously shown and described. The elevated portion of the frame is connected with the rear portion of the frame carrying the rear guiding-rollers and disks by inclined braces M' M'. The vertically-extending arms $b^\times b^\times$, which adjust the rear rollers, are extended to a point about on a line with the elevated frame where they are connected with the link from the adjusting-lever near the driver's seat. In this construction all the parts which cross from one side of each frame to the other are so elevated that even corn that is quite tall will pass under them and the cultivator can thus be used to cultivate corn as long as cultivation is desirable or necessary, thus avoiding the necessity of having a separate cultivator to finish.

In Figs. 9, 10, and 11 I have shown another form of coupling device, which is my preferred form. This device consists of a single bar N, pivoted to one frame, as shown at $n$, and a double bar, or two connecting bars O O, pivotally connected to the other frame at $o$. The two bars O O are at such a distance apart as to permit the bar N to pass between them, and the bar N is provided with a pair of flanged rollers $n'$ $n'$, which engage the upper sides of bars O O. The bars O O are provided with a similar flanged roller $o'$, which engages upper side of the bar N, and this device will therefore allow for all the necessary movements of the cultivator-frames. The driver's seat will be secured either to bar N or bars O O, adjacent to the center of the machine.

What I claim, and desire to secure by Letters Patent, is—

1. In a double row cultivator, the combination with the cultivator frames, of pivotally supported guiding rollers for each frame and independent steering devices for each frame, connected with said guiding rollers, substantially as described.

2. In a double row cultivator, the combination with the cultivator frames, of pivotally supported guiding rollers for each frame, independent steering devices for each frame connected with said guiding rollers, and coupling devices for connecting said frames but allowing them to move independently of each other, substantially as described.

3. In a double row cultivator, the combination with the cultivator frames, of pivotally mounted guiding rollers for each frame, steering devices connected with said guiding rollers, and draft devices connected to said frames and having lateral play with respect to the same, substantially as described.

4. In a double row cultivator, the combination with the cultivator frames, of pivotally mounted guiding rollers for each frame, steering devices connected with said guiding rollers, and a tongue movably connected to each of said frames and having lateral play with respect thereto, substantially as described.

5. In a double row cultivator, the combination with the cultivator frames, of pivotally mounted guiding rollers for each frame, steering devices connected with said guiding rollers, a tongue movably connected with the guiding rollers of each frame, and means for rigidly connecting said tongues with their respective guiding rollers, substantially as described.

6. In a double row cultivator, the combination with the cultivator, of pivotally mounted guiding rollers for each frame, independent steering devices for each frame connected with said guiding rollers, a tongue movably connected with the guiding rollers of each frame, and means for rigidly connecting each of said tongues with its respective guiding rollers, substantially as described.

7. In a double row cultivator, the combination with the cultivator frames, of a coupling board pivotally connected to one of said frames, and a casting pivotally connected with the other frame and provided with guiding rollers engaging the lateral edges of said coupling board, substantially as described.

8. In a double row cultivator, the combination with the cultivator frames, of a pivoted truck for each frame provided with guiding rollers, a steering bar for each of said trucks, an independent steering device for each frame connected with said steering bar, and including among its members foot levers and a draft device movably connected with each of said trucks, substantially as described.

9. In a double row cultivator, the combination with the cultivator frames, of pivotally supported guiding rollers for each frame independent steering devices for each frame, connected with said guiding rollers, devices for coupling said frames rigidly together and devices for coupling said steering devices for joint action substantially as described.

In testimony whereof I affix my signature in presence of two witnesses.

ELI E. HARTZELL.

Witnesses:
G. H. BURTON,
E. H. BURINGTON.